(12) United States Patent
Guan

(10) Patent No.: US 9,230,165 B2
(45) Date of Patent: Jan. 5, 2016

(54) OBJECT DETECTION APPARATUS, VEHICLE-MOUNTED DEVICE CONTROL SYSTEM AND STORAGE MEDIUM OF PROGRAM OF OBJECT DETECTION

(71) Applicant: Haike Guan, Kanagawa (JP)

(72) Inventor: Haike Guan, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/193,249

(22) Filed: Feb. 28, 2014

(65) Prior Publication Data

US 2014/0254872 A1   Sep. 11, 2014

(30) Foreign Application Priority Data

Mar. 6, 2013 (JP) ................................. 2013-044434
Nov. 28, 2013 (JP) ................................. 2013-245723

(51) Int. Cl.
*G06K 9/00* (2006.01)
*G06K 9/46* (2006.01)

(52) U.S. Cl.
CPC ........ *G06K 9/00624* (2013.01); *G06K 9/00805* (2013.01); *G06K 9/4614* (2013.01)

(58) Field of Classification Search
CPC ................................................. G06K 9/00624
USPC ........................................................ 382/103
See application file for complete search history.

(56) References Cited

U.S. PATENT DOCUMENTS

| 5,410,346 | A | * | 4/1995 | Saneyoshi et al. ............ 348/116 |
| 5,606,627 | A | * | 2/1997 | Kuo .............................. 382/154 |
| 6,104,840 | A | | 8/2000 | Ejiri et al. |
| 6,477,260 | B1 | * | 11/2002 | Shimomura ................... 382/106 |
| 6,985,619 | B1 | * | 1/2006 | Seta et al. ..................... 382/154 |
| 7,636,631 | B2 | * | 12/2009 | Shimizu et al. ............... 701/437 |
| 7,650,217 | B2 | * | 1/2010 | Ueyama ......................... 701/96 |
| 8,611,609 | B2 | * | 12/2013 | Oyama ......................... 382/104 |
| 8,855,367 | B2 | * | 10/2014 | Kido ............................. 382/103 |
| 8,874,317 | B2 | * | 10/2014 | Marczok et al. ................ 701/41 |
| 2003/0099377 | A1 | * | 5/2003 | Hanawa ........................ 382/104 |
| 2003/0198398 | A1 | | 10/2003 | Guan et al. |
| 2004/0032407 | A1 | | 2/2004 | Ejiri et al. |
| 2004/0080640 | A1 | | 4/2004 | Aoki et al. |

(Continued)

FOREIGN PATENT DOCUMENTS

| JP | 2008-146549 | 6/2008 |
| JP | 2012-226689 | 11/2012 |
| JP | 2013-092975 | 5/2013 |

*Primary Examiner* — Kim Vu
*Assistant Examiner* — Molly Delaney
(74) *Attorney, Agent, or Firm* — Harness, Dickey & Pierce, P.L.C.

(57) ABSTRACT

An object detection apparatus, using at least one processing circuit, for detecting an object in an image capturing area based on parallax information generated from a plurality of images captured by a plurality of image capturing units, includes a parallax histogram information generator to generate vertical-direction parallax histogram information indicating a frequency profile of parallax values in each of vertical row areas in a captured image based on the parallax information; and an object image area extraction unit to extract, among parallax values having frequency exceeding a given frequency threshold, a group of pixels having parallax values existing within proximity of a given parallax value and having a pixel-to-pixel interval in an image left-to-right direction within a given range as an object image area displaying an object based on the vertical-direction parallax histogram information.

6 Claims, 13 Drawing Sheets

(56) References Cited

U.S. PATENT DOCUMENTS

| | | |
|---|---|---|
| 2004/0218833 A1 | 11/2004 | Ejiri et al. |
| 2006/0233424 A1* | 10/2006 | Miyajima et al. ............. 382/104 |
| 2007/0003341 A1 | 1/2007 | Guan et al. |
| 2007/0122059 A1 | 5/2007 | Ejiri et al. |
| 2008/0027994 A1 | 1/2008 | Guan |
| 2008/0232640 A1 | 9/2008 | Ishizu et al. |
| 2008/0232693 A1 | 9/2008 | Guan et al. |
| 2008/0232698 A1 | 9/2008 | Shi et al. |
| 2008/0253664 A1 | 10/2008 | Li et al. |
| 2008/0309517 A1* | 12/2008 | Saito ............................. 340/937 |
| 2009/0109304 A1 | 4/2009 | Guan |
| 2009/0185054 A1 | 7/2009 | Ejiri et al. |
| 2009/0190827 A1* | 7/2009 | Saito ............................. 382/154 |
| 2011/0066343 A1* | 3/2011 | Ota et al. ........................ 701/70 |
| 2011/0122264 A1 | 5/2011 | Yamanaka et al. |
| 2012/0207348 A1* | 8/2012 | Saito ............................. 382/103 |
| 2012/0294482 A1* | 11/2012 | Kasaoki ....................... 382/103 |
| 2012/0314933 A1* | 12/2012 | Morifuji et al. ............... 382/154 |
| 2013/0322692 A1 | 12/2013 | Guan |
| 2014/0192156 A1* | 7/2014 | Kumai et al. ................... 348/43 |

* cited by examiner

LUMINANCE IMAGE

PARALLAX IMAGE

U MAP IMAGE

U MAP IMAGE

U MAP IMAGE

PARALLAX IMAGE

| TARGET OBJECT | AVERAGE PARALLAX | Wmin | Wmax | Hmin | Hmax |
|---|---|---|---|---|---|
| AUTOMOBILE | $\Delta 1$ | Wmin_1 | Wmax_1 | Hmin_1 | Hmax_1 |
| PEDESTRIAN | $\Delta 2$ | Wmin_2 | Wmax_2 | Hmin_2 | Hmax_2 |
| ⋮ | ⋮ | ⋮ | ⋮ | ⋮ | ⋮ |
| BUS | $\Delta n$ | Wmin_n | Wmax_n | Hmin_n | Hmax_n |

OBJECT DETECTION APPARATUS, VEHICLE-MOUNTED DEVICE CONTROL SYSTEM AND STORAGE MEDIUM OF PROGRAM OF OBJECT DETECTION

CROSS-REFERENCE TO RELATED APPLICATION

This application claims priority pursuant to 35 U.S.C. §119 to Japanese Patent Application Nos. 2013-044434, filed on Mar. 6, 2013 and 2013-245723, filed on Nov. 28, 2013 in the Japan Patent Office, the disclosures of which is incorporated by reference herein in their entirety.

BACKGROUND

1. Technical Field

The present invention relates to an object detection apparatus to generate parallax information based on a plurality of captured images and to detect an object in an image capturing area based on the parallax information, and a vehicle-mounted device control system, and a program of object detection stored on a recording medium.

2. Related Art

At present, object detection apparatuses that can detect a target object such as obstacles based on a captured image of an area ahead of a vehicle by an image capturing device are used for automobiles, trains, ships, airplanes or the like. These object detection apparatuses are available, for example, as driver support systems such as adaptive cruise control (ACC) to reduce the burden on drivers of vehicles. The driver support systems provide various functions, including a brake-control-and-alert function that alerts the driver to take corrective action to avoid a collision or reduce the impact of the collision, a driving speed adjustment function to maintain a safe minimum distance between vehicles, and a stray prevention function to prevent the vehicle from straying into another lane. To effectively use these functions, various target objects existing around the vehicle need to be recognized with high precision in an image captured ahead of the vehicle, wherein the various target objects are, for example, other vehicles, pedestrians, road objects (lanes, manhole covers), road-side objects (telegraph poles, guard rails, curbstones, median strips), lanes of the vehicle, and objects, which may need to be recognized to avoid collision.

JP-2012-226689-A discloses an environment recognition apparatus that identifies types of target objects based on luminance information and height position information of the target objects in a detection area such as image capturing area. As to the environment recognition apparatus, an identification number for a specific object is assigned to a target portion having luminance included in a luminance area of the specific object, set in advance, to prepare a specific object map.

Then, the height position of each target portion from the road surface is obtained for each target portion assigned with an identification number. The height position of each target portion can be obtained using parallax information computed from data of two images captured by two image capturing devices. Then, if the height position is within the height position range of the specific object identified by the identification number in a specific object table, the concerned target portion is provisionally determined as the concerned specific object.

After this provisional determination, a certain target portion is used as a base point, and other target portion which is within a given horizontal distance range from the certain target portion and within a given relative distance range from the vehicle are grouped as target portions provisionally determined as the same specific object (i.e., assigned with the same identification number), and the grouped target portions are determined as a target object. Then, a width of the determined target object is computed. If the computed width is within a width range of the concerned specific object in the specific object table, the target object is determined as the concerned specific object.

Three types of information such as height, width (horizontal direction length), distance from the image capturing device to an object in the image capturing area become key information when selectively detecting each of objects in the image capturing area with high precision because one face having the same distance from the image capturing device and having a certain height and a certain width can be assumed as one face of an object, and the above mentioned three types of information is required to identify such one face.

In the environment recognition apparatus disclosed in JP-2012-226689-A, a group of target portions existing in a given height position range and having the same or similar level of luminance is provisionally determined as one target object, and the group of target portions is further grouped of target portions existing within a given horizontal distance range and at within a given relative distance range (distance to the concerned object). Therefore, the environment recognition apparatus disclosed in JP-2012-226689-A may selectively detects each of the target object using three information of object such as height, width, and distance.

However, in the environment recognition apparatus disclosed in JP-2012-226689-A, three types of information of object such as height, width, and distance may need to obtain one by one sequentially. Specifically, at first, target portions having the same or similar luminance and existing in a certain height position range are provisionally determined as one target object, with which height information of the target object is obtained. Then, in a process of identifying target portions existing within a given horizontal distance range, width information of the target object is obtained. Then, in a process of identifying the target portions existing within a given relative distance range, distance information to the target object is obtained. Because three types of information of height, width, and distance of object is obtained one by one sequentially, an object detection processing that selectively detects each object may require a longer time, which is not preferable.

SUMMARY

In one aspect of the present invention, an object detection apparatus, using at least one processing circuit, for detecting an object in an image capturing area based on parallax information generated from a plurality of images captured by a plurality of image capturing units is devised. The object detection apparatus includes a parallax histogram information generator to generate vertical-direction parallax histogram information indicating a frequency profile of parallax values in each of vertical row areas in a captured image based on the parallax information, the vertical row area preparable by dividing the captured image in a plurality of areas in a left-right direction; and an object image area extraction unit to extract, among parallax values having frequency exceeding a given frequency threshold, a group of pixels having parallax values existing within proximity of a given parallax value and having a pixel-to-pixel interval in an image left-to-right direction within a given range as an object image area displaying an object based on the vertical-direction parallax histogram information.

In another aspect of the present invention, a computer-readable storage medium storing an object detection program that, when executed by a computer having a processing circuit, causes the computer to execute a method of detecting an object in an image capturing area based on parallax information is devised. The method includes the steps of 1) generating parallax information based on the plurality of captured images captured by a plurality of image capturing units (generating step of parallax information); 2) generating vertical-direction parallax histogram information indicating a frequency profile of parallax values in each of vertical row areas in a captured image based on the parallax information, the vertical row area preparable by dividing the captured image in a plurality of areas in a left-right direction (generating step of vertical-direction parallax histogram information); and 3) extracting, among parallax values having frequency exceeding a given frequency threshold, a group of pixels having parallax values existing within proximity of a given parallax value and having a pixel-to-pixel interval in an image left-to-right direction within a given range as an object image area displaying an object, based on the vertical-direction parallax histogram information (extracting step of object image area).

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
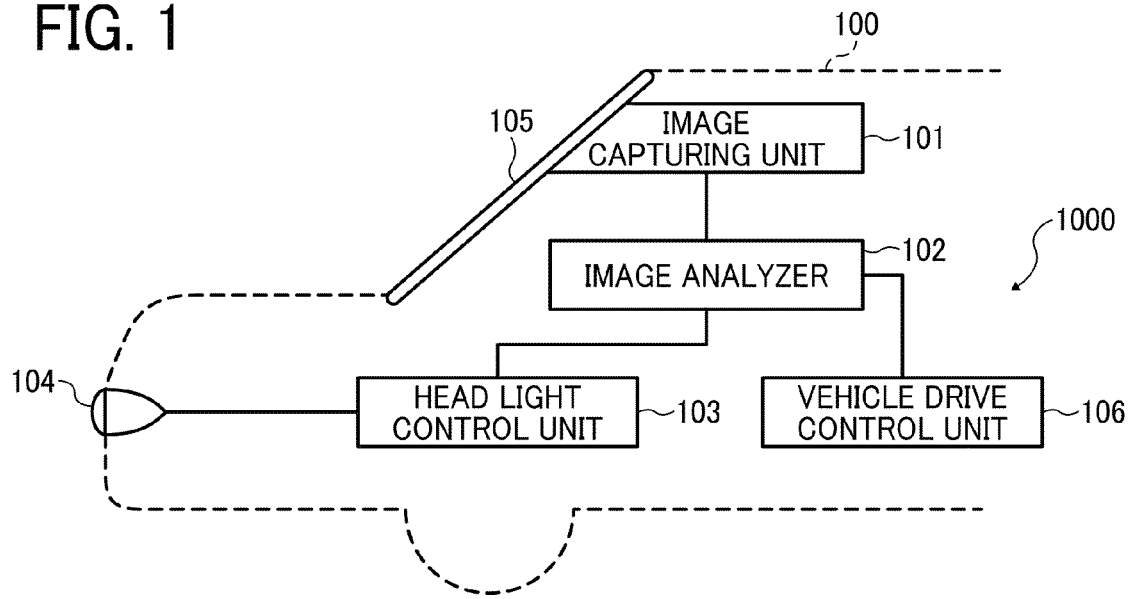
FIG. 1 is a schematic configuration of a vehicle-mounted device control system according to an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, an apparatus or system according to an example embodiment is described hereinafter.

A description is given of an object detection apparatus 200 according to an example embodiment, which can be used in a vehicle system such as a vehicle-mounted device control system. The object detection apparatus 200 can be applied to the vehicle-mounted device control system and other systems. The vehicle is not limited to any specific type of vehicles and may include various types of vehicles such as automobiles, robots, or the like.

FIG. 1 shows a schematic configuration of a vehicle-mounted device control system 1000 according to an example embodiment, which is applied to a vehicle 100. The vehicle 100 is a mobile vehicle such as an automobile, a robot, or the like that can move on a surface such as a road surface. The vehicle-mounted device control system includes an image capturing unit 101. The image capturing unit 101 is used as an image capturing device to capture an image of area ahead of the vehicle 100 that moves in a given direction, in which the area ahead of the vehicle 100 may be referred to as an image capturing area. The image capturing unit 101 is mounted, for example, near a rear-view mirror disposed at a windshield 105 of the vehicle 100.

Various data such as image data captured by the image capturing unit 101 is input to the image analyzer 102 used as an image processing unit. The image analyzer 102 analyzes the data, transmitted from the image capturing unit 101, in which the image analyzer 102 can be used to compute information of other vehicle existing in a forward direction of the vehicle 100 such as vehicle position, a point of the compass (e.g., north, south, east, west), and distance to other vehicle ahead of the vehicle 100. When other vehicle is to be detected as a target, the other vehicle on the road surface can be detected using parallax information.

Further, the computed result computed by the image analyzer 102 is transmitted to a vehicle drive control unit 106, which can be also referred to as the vehicle controller. The vehicle drive control unit 106 can provide a cruise assistance control based on a detection result of a vehicle ahead of the vehicle 100. Specifically, when a distance from the vehicle 100 to the ahead vehicle becomes shorter or longer, the vehicle drive control unit 106 conducts the cruise assistance control such as reporting a warning to a driver of the vehicle 100 and/or controlling the steering and brakes of the vehicle 100. Further, based on a detection result of an incoming vehicle, the vehicle drive control unit 106 conducts a switching control of high beam/low beam of the headlight 104 using a headlight control unit 103.

Figure 2:
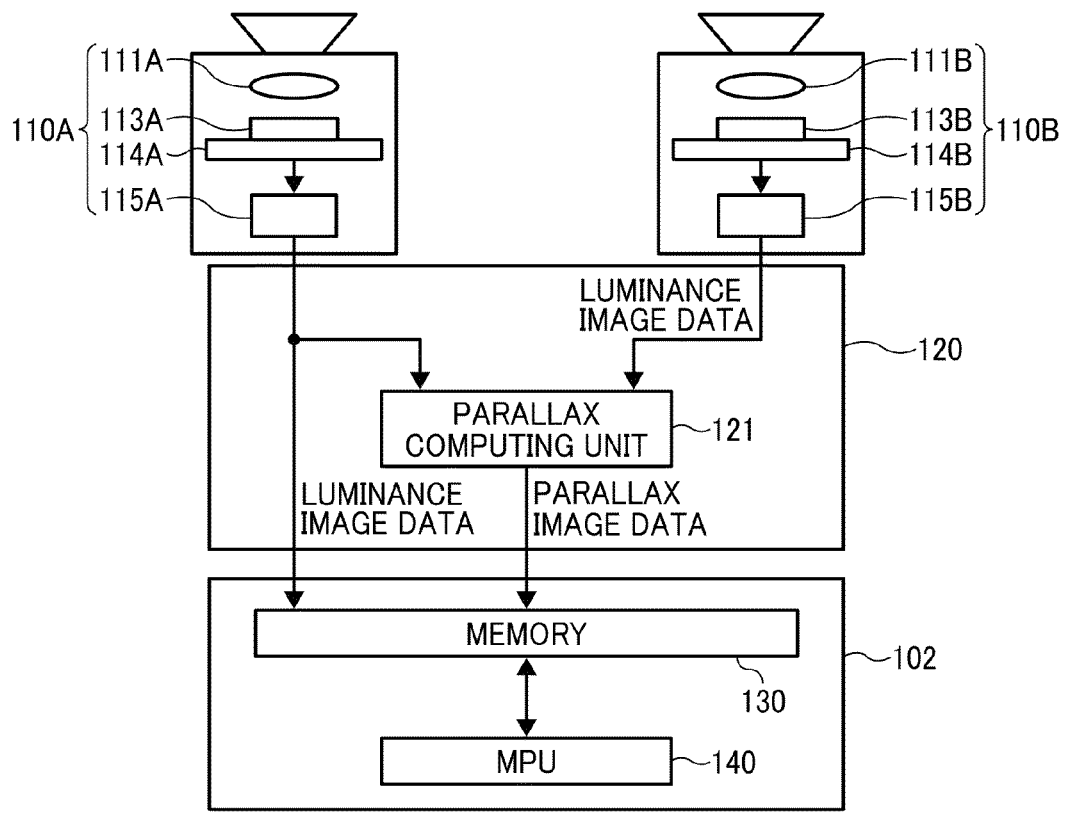
FIG. 2 shows a schematic configuration of an image capturing unit and an image analyzer of the vehicle-mounted device control system of FIG. 1.

FIG. 2 shows a schematic configuration of the image capturing unit 101 and the image analyzer 102. The image capturing unit 101 is, for example, a stereo camera having a plurality of capturing units such as a first capturing unit 110A and a second capturing unit 110B as image capturing units, in which the first capturing unit 110A and the second capturing unit 110B have the same configuration.

The first capturing unit 110A is configured with a first capturing lens 111A, a first image sensor 113A, a first sensor board 114A, and a first signal processor 115A. The second capturing unit 110B is configured with a second capturing lens 111B, a second image sensor 113B, a second sensor board 114B, and a second signal processor 115B. The first sensor board 114A is disposed with the first image sensor 113A having arranged image capturing elements two-dimensionally, and the second sensor board 114B is disposed with the second image sensor 113B having arranged image capturing elements two-dimensionally. The first signal processor 115A converts analog electrical signals output from the first sensor board 114A (i.e., light quantity received by light receiving elements on the first image sensor 113A) to digital signals to prepare captured image data, and outputs the captured image data. The second signal processor 115B converts analog electrical signals output from the second sensor board 114B (i.e., light quantity received by light receiving elements on the second image sensor 113B) to digital signals to prepare captured image data, and outputs the captured image data. The image capturing unit 101 can output luminance image data and parallax image data.

Further, the image capturing unit 101 includes a processing hardware 120 such as a field-programmable gate array (FPGA). The processing hardware 120 includes a parallax computing unit 121 to obtain parallax image from luminance image data output from the first capturing unit 110A and the second capturing unit 110B. Specifically, the parallax computing unit 121 computes the parallax between an image captured by the first capturing unit 110A and an image captured by the second capturing unit 110B by comparing a corresponding image portion on the captured images. The parallax computing unit 121 can be used as a parallax information generator.

The value of parallax can be computed using one image captured by one of the first and second capturing units 110A and 110B as a reference image and other image captured by other one of the first and second capturing units 110A and 110B as a comparing image. In the image capturing area, a concerned image portion at the same point of the reference image and the comparing image are compared to compute a positional deviation between the reference image and the comparing image as parallax of the concerned image portion. By using fundamental of triangulation, the distance to the same point of the concerned image portion in the image capturing area can be computed based on the parallax.

The image analyzer 102 includes, for example, a memory 130, and a micro processing unit (MPU) 140. The memory 130 stores luminance image data and parallax image data output from the image capturing unit 101. The MPU 140 installs software used for the recognition processing of target objects and controlling the parallax calculation. The MPU 140 conducts various recognition processing using the luminance image data and parallax image data stored in the memory 130.

Each of the first image sensor 113A and the second image sensor 113B is an image sensor using, for example, a charge coupled device (CCD), a complementary metal oxide semiconductor (CMOS) or the like. The image capturing element (or light receiving element) of the image sensors 113A and 113B employs, for example, a photodiode. The photodiode is disposed for each of image capturing pixels by arraying a plurality of the photodiodes two-dimensionally. Further, a micro lens is disposed at an incidence side of each of the photodiodes to increase light condensing efficiency. The first image sensor 113A and the second image sensor 113B are bonded to a printed wiring board (PWB) using wire bonding or the like, with which the first sensor board 114A and the second sensor board 114B are formed.

Figure 3:
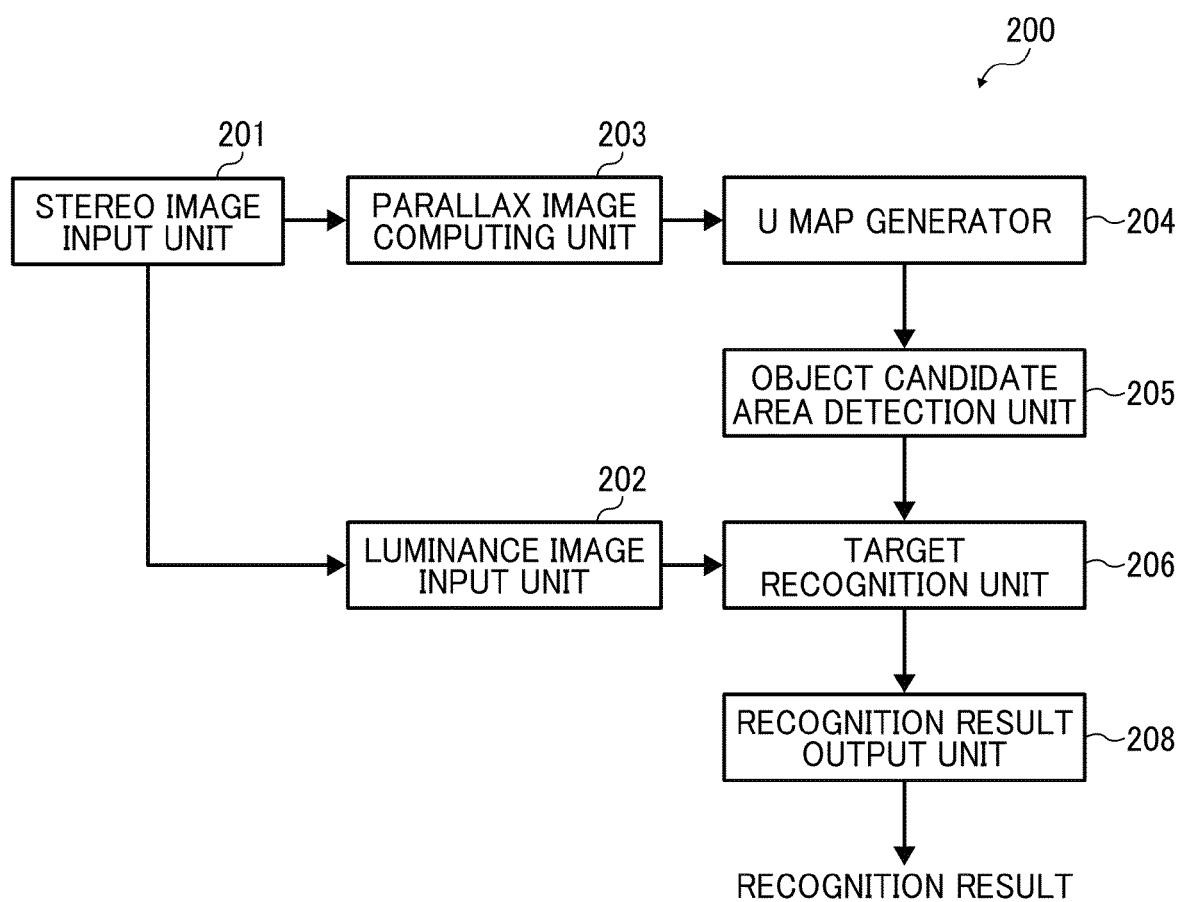
FIG. 3 is a block diagram of object recognition processing according to an example embodiment.

A description is given of a recognition apparatus for recognizing objects according to a first example embodiment with reference to FIG. 3, which is a block diagram of the object detection apparatus 200. As shown in FIG. 3, the object detection apparatus 200 includes, for example, a stereo image input unit 201, a luminance image input unit 202, a parallax image computing unit 203, an U map generator 204, an object candidate area detection unit 205, a target recognition unit 206, and a recognition result output unit 208. The object detection apparatus 200 can be configured using the processing hardware 120 and the image analyzer 102 shown in FIG. 2.

The stereo image input unit 201 is input with a stereo image, which is two luminance image data output from the first capturing unit 110A and the second capturing unit 110B of the image capturing unit 101. The luminance image input unit 202 is input with a reference image (luminance image) from the stereo image input unit 201, wherein the reference image can be one of a left image and a right image composing the stereo image. The input stereo image and the luminance image can be stored, for example, in a memory.

The parallax image computing unit 203, which can be used as a parallax information generator, computes parallax value for each pixel on the reference image based on the stereo image, which is input to the stereo image input unit 201, and then generates parallax image data (parallax information) that can generate a parallax image having the parallax value as pixel value. Therefore, the parallax image data includes, for example, three dimensional coordinate information (x, y, d) wherein a left-to-right direction position on parallax image (left-to-right direction position on reference image) is referred to as "x," an upper-to-lower direction position on parallax image (upper-to-lower direction position of reference image) is referred to as "y," and parallax value is referred to as parallax value "d." The parallax value d can be computed using the fundamental of triangulation shown in FIG. 4, in which with respect to a point O on the object 301, a distance Δ1 and a distance Δ2 between the focal position and focal center for the left and right images are computed, with which the parallax value d can be computed as d=Δ1+Δ2.

The U map generator 204 can function as a parallax histogram information generator that generates vertical-direction parallax histogram information. Specifically, the U map generator 204 generates U map information, which is parallax histogram information in the vertical direction indicating a frequency profile of parallax value d in each vertical row area prepared by dividing a parallax image (captured images) into a plurality of areas in the left-to-right direction. In the example embodiment, a width of each vertical row area is, for example, one pixel.

The U map information can be obtained by converting the three dimensional coordinate information (x, y, d), corresponded to each pixel and included in the parallax image data, to three dimensional coordinate information (x, d, f), wherein the three dimensional coordinate information (x, d, f) includes the left-to-right direction position "x" on parallax image on the X-axis, the parallax value "d" on the Y-axis, and the frequency "f" of the concerned parallax value "d" in the vertical row area on the Z-axis, wherein the vertical row area corresponds to an image left-to-right direction position "x" of the concerned image.

Figure 5:
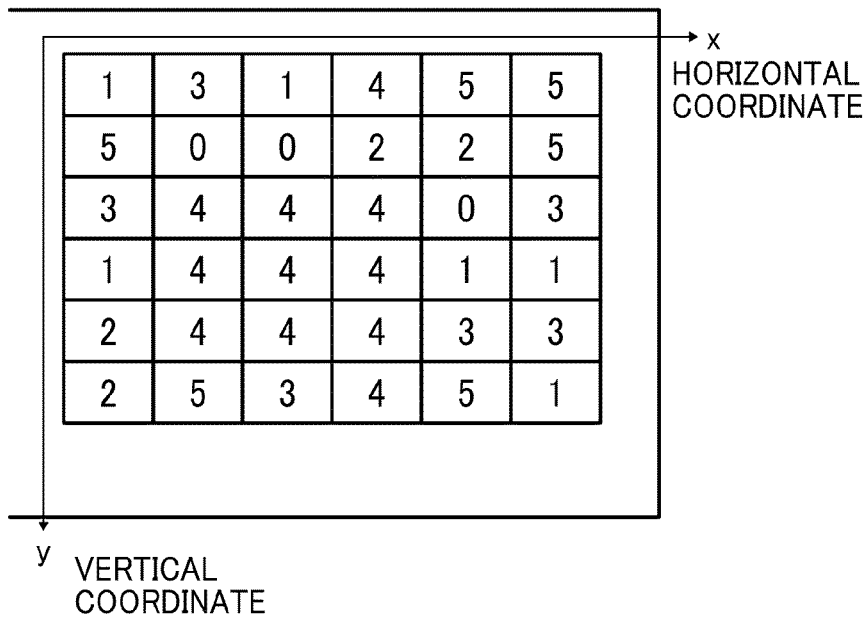
FIG. 5 is an example of parallax value profile of parallax image.
Figure 6:
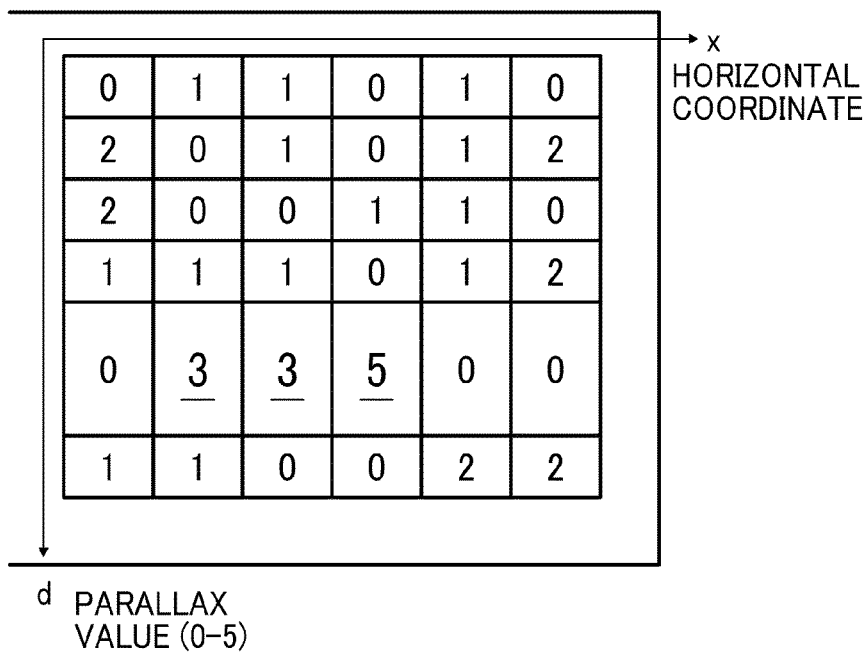
FIG. 6 is an example of parallax histogram (U map) in the vertical direction indicating a frequency profile of parallax value for each vertical row area of the parallax image of FIG. 5.

FIG. 6 shows an example of U map information. For example, when parallax image data having the parallax value profile shown in FIG. 5 is input, the U map generator 204 computes a frequency profile of parallax values for each vertical row area and outputs U map information as shown in FIG. 6. Based on this U map information, pixels corresponding to parallax values having frequency f exceeding a given frequency threshold are plotted on the two dimensional coordinate system defined by the parallax value "d" on the vertical axis and the image left-to-right direction position "x" on the horizontal axis to generate parallax histogram image (U map) in the vertical direction.

The object candidate area detection unit 205 can function as an object image area extraction unit. Based on the U map information, among parallax values "d" having frequency f exceeding a given frequency threshold, a group of pixels having parallax values within a given proximity range from a given parallax value and having a pixel-to-pixel interval Δl (el) in the image left-to-right direction within a given range are extracted as a candidate area of an object image (i.e., object candidate area) that displays one object. In this disclosure, the object candidate area is extracted by also using information of the luminance image (reference image) input to the luminance image input unit 202.

The target recognition unit 206 can function as a target object determination unit. The target recognition unit 206 conducts a recognition processing of a target object to an object candidate area detected by the object candidate area detection unit 205. The recognition result is output from the recognition result output unit 208.

Figure 7:
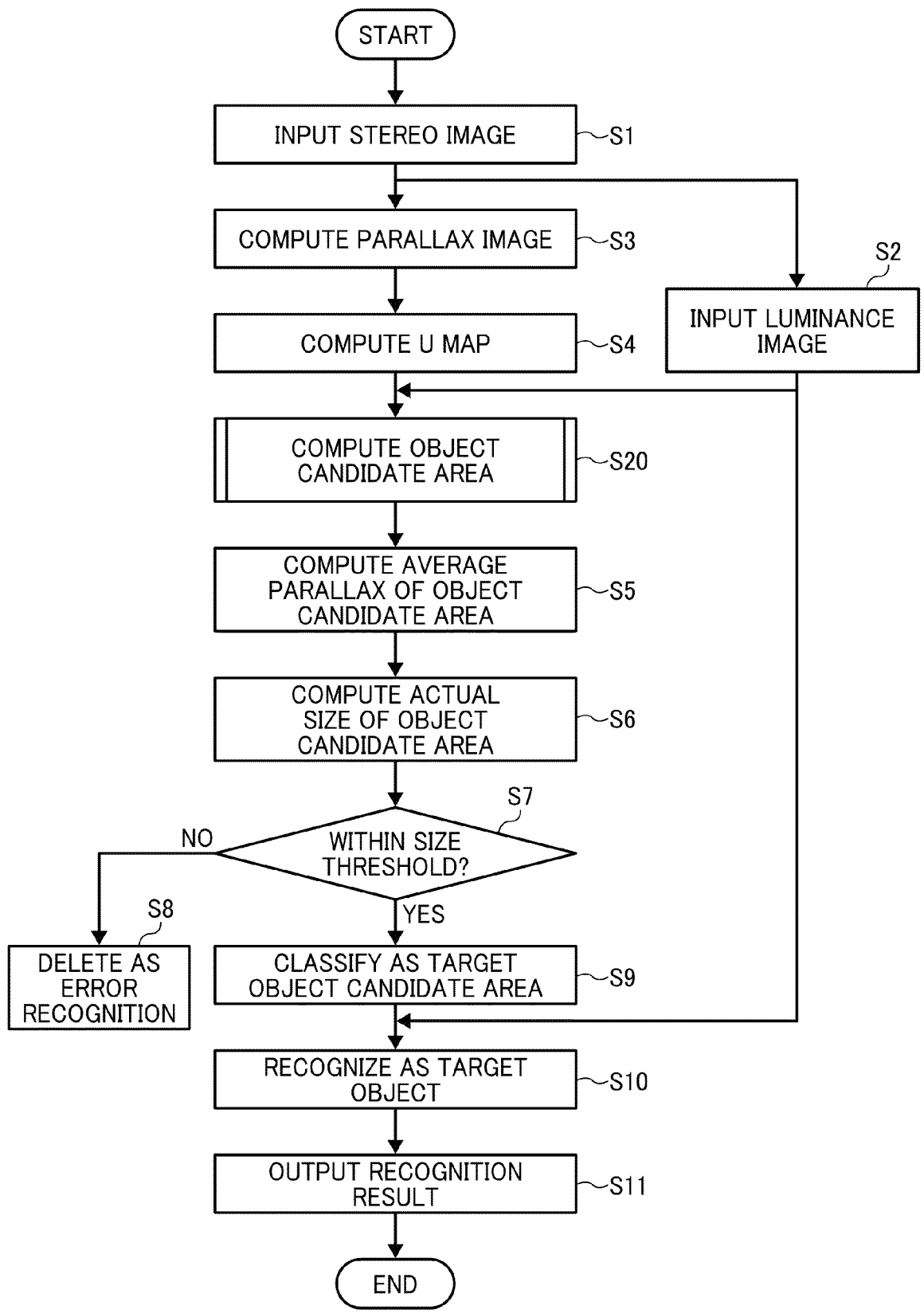
FIG. 7 is a flowchart showing the steps of a process of object recognition processing.
Figure 8:
FIG. 8 is an example of a reference image such as luminance image.

A description is given of recognition processing of an object according to an example embodiment with reference to FIG. 7, which is a flowchart showing the steps of a process of recognition of the object according to the example embodiment. As shown in FIG. 7, the stereo image input unit 201 is input with luminance image data (stereo image) from each of the first capturing unit 110A and the second capturing unit 110B of the image capturing unit 101 (step S1). Then, the luminance image input unit 202 is input with a reference image (luminance image) in the stereo image (step S2). FIG. 8 is an example image of the reference image (luminance image).

Figure 9:
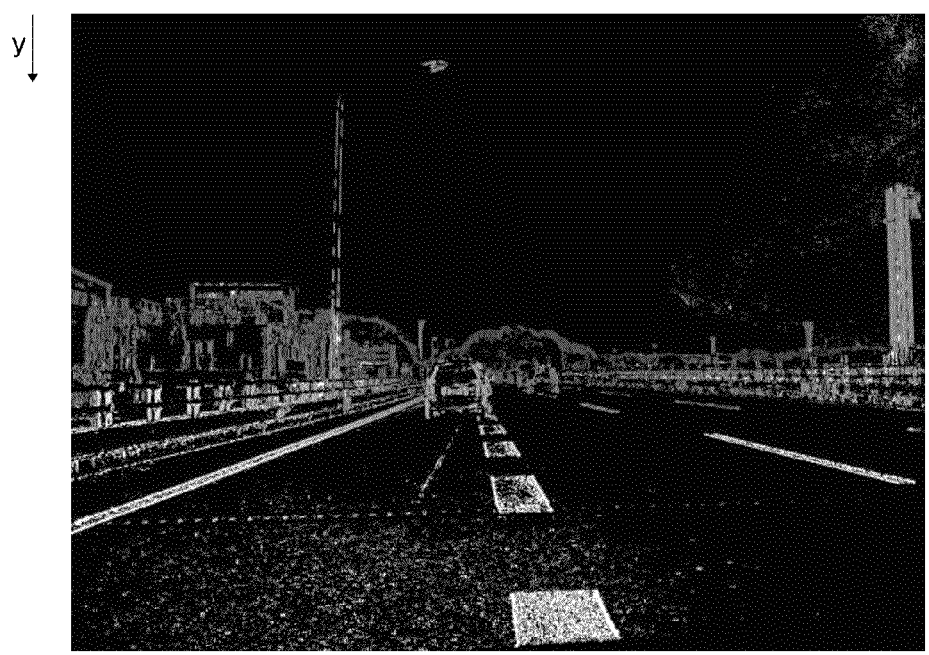
FIG. 9 is an example of a parallax image corresponding to the luminance image of FIG. 8.

The stereo image data received by the stereo image input unit 201 is transmitted to the parallax image computing unit 203. The parallax image computing unit 203 computes parallax value for each pixel on the reference image based on the stereo image input to the parallax image computing unit 203, and computes parallax image data that can generate a parallax image having the parallax value as pixel value (step S3). FIG. 9 is an example of parallax image corresponding to an example of image shown in FIG. 8. In the example parallax image of FIG. 9, the greater the parallax value (i.e., the shorter the distance), the greater for pixel value of each pixel (i.e., greater luminance image).

The generation process of parallax image data can be conducted, for example, as follows. At first, for one line of the reference image data, a block composed of a plurality of pixels (e.g., 5×5 pixels) having one concerned pixel at the center is defined. Meanwhile, on the same line having the concerned pixel on comparing image data, a block having the same size of the block defined in the reference image data is shifted for one pixel in the horizontal line direction (left/right direction in the image). Based on this setting, a correlating value indicating correlation between a feature value indicating a pixel value of the block defined in the reference image data and a feature value indicating a pixel value of the block in the comparing image data is respectively computed.

Then, based on the computed correlating values, among each one of blocks in the comparing image data, one block in the comparing image data having the most correlated relation with the block defined in the reference image data is selected, wherein this block selection process may be called as block matching algorithm.

Then, a positional deviation between the concerned pixel of the block in the reference image data and the corresponding pixel in the block in the comparing image data selected by the block matching algorithm is computed as parallax value d. By conducting the computing process of parallax value d for a part of or entire area of the reference image data, parallax image data can be obtained.

As for the feature value of block used for the block matching algorithm, for example, the value of each pixel (luminance value) in the block can be used. As for the correlating value, for example, a total of an absolute value of difference between a value of each pixel (luminance value) in the block in the reference image data and a value of corresponding each pixel (luminance value) in the block in the comparing image data can be used. In this case, a block having the smallest total value can be the most correlated block.

Figure 10:
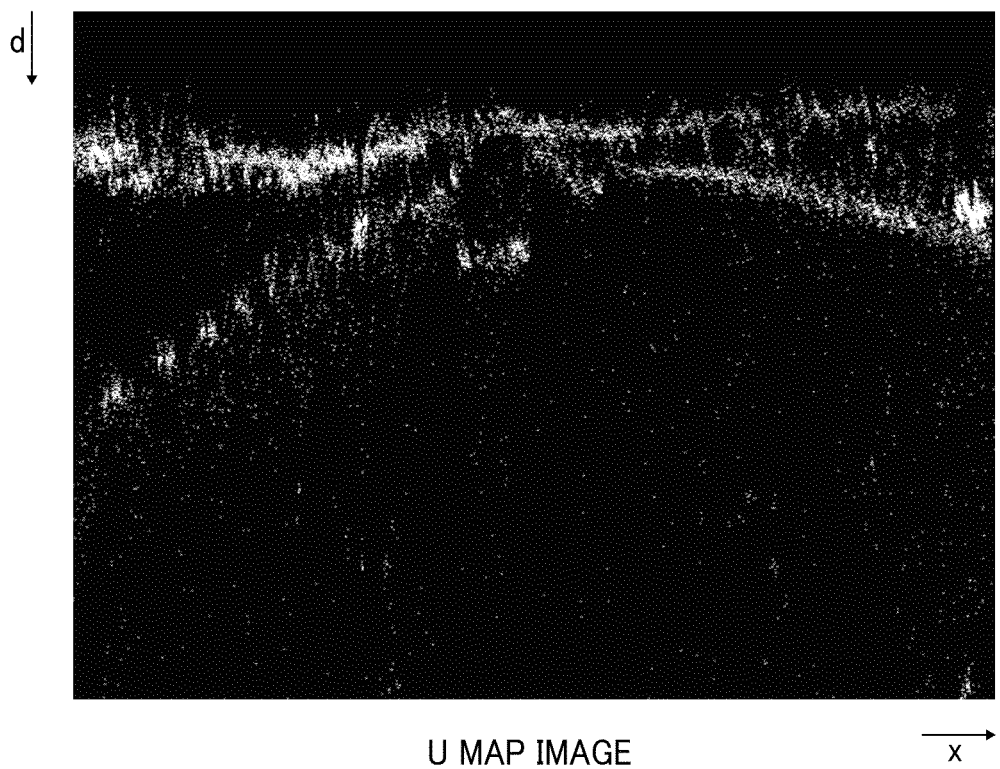
FIG. 10 is an example of U map image corresponding to the parallax image of FIG. 9.

The above generated parallax image data is transmitted to the U map generator 204, and the U map generator 204 converts the parallax image data (x, y, d) to U map information (x, d, f), in which the U map information is computed (step S4). FIG. 10 is a parallax histogram image (U map) in a vertical direction for the parallax image shown in FIG. 9. As to the parallax image of FIG. 9, the parallax value d is set to the vertical axis, the image left-to-right direction position x is set to the horizontal axis on a two-dimensional coordinate system, and then pixels having parallax values having a frequency f exceeding a given frequency threshold are plotted to prepare the U map shown in FIG. 10. Further, in an example of U map of FIG. 10, the greater the frequency, the greater the pixel value of each pixel (i.e., greater luminance image).

The generation of U map is explained using the U map shown in FIG. 6. For example, on the parallax image data shown in FIG. 5, a pixel group having a parallax value d=4 are pixels displaying an object existing at the same distance point from the vehicle 100. Because these pixels (pixels having the same parallax value) are arranged on the same upper-to-lower direction position in the U map as shown in FIG. 6, among these pixels, pixels displaying one object having a certain width becomes a horizontal line pattern profile on the U map. Further, among these pixels displaying one object having a certain height indicates a given frequency or more on the U map. Therefore, a pixel group having a given frequency or more and having a horizontal line pattern profile on the U map can be pixels displaying one object having the certain width and the certain height. In the example embodiment, by using this feature, the object candidate area detection unit 205 computes an object candidate area used for detecting candidate area of object image area (object candidate area) displaying each object in an image capturing area (actual space) (step S20).

Figure 11:
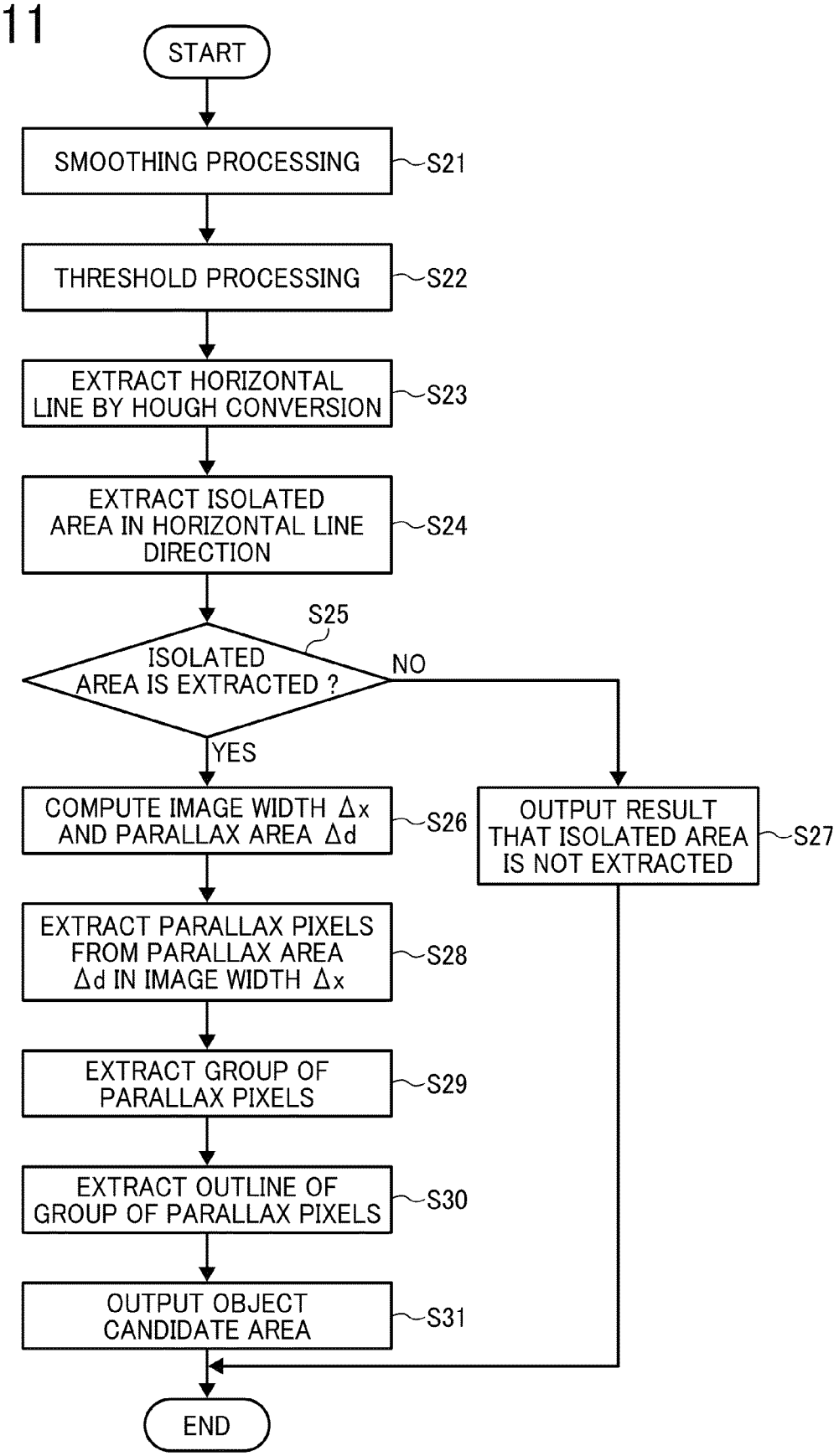
FIG. 11 is a flowchart showing the steps of a process of computing an object candidate area.

FIG. 11 is a flowchart showing the steps of a process of computing an object candidate area by the object candidate area detection unit 205. A description is given of an example case that detects, for example, other vehicles displayed in the example image of FIG. 8.

Figure 12:
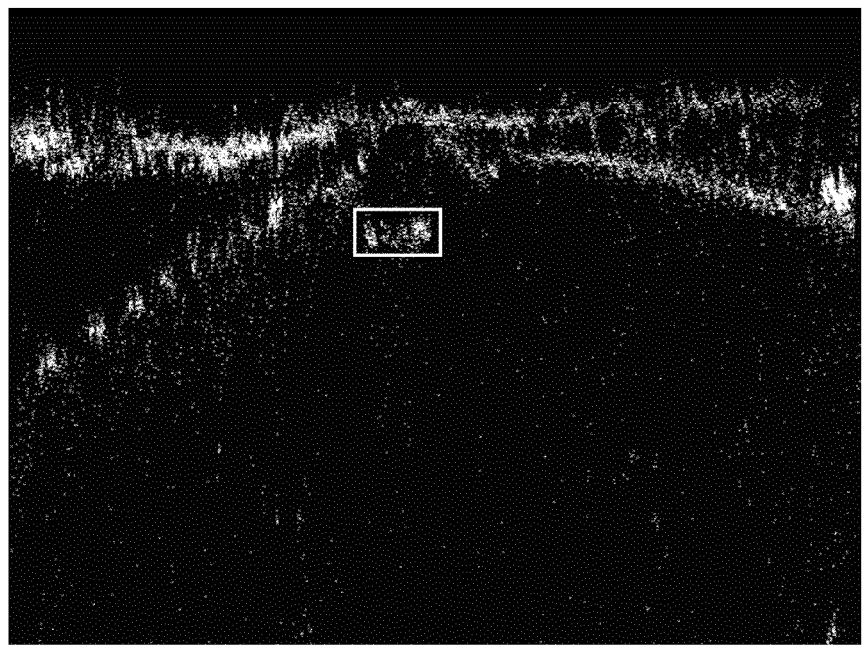
FIG. 12 shows a feature of horizontal line pattern on the U map image of FIG. 10.

Typically, each point on the rear side of other vehicles may have the same distance from the vehicle 100. Therefore, parallax values of pixels displaying each one of the points on other vehicles may become the same value. Therefore, these pixels have a feature of a horizontal line pattern on the U map as shown in FIG. 12. Therefore, an area indicating the feature (i.e., an area encircled by a white frame in FIG. 12) is extracted, and a pixel group corresponding to this area is extracted as an object candidate area, with which an image area displaying other vehicle can be identified. Further, for any types of object other than other vehicle, a face of one object displayed on an image may exist at the substantially same distance from the vehicle 100. Therefore, an image area displaying other object can be identified similarly.

In the computing process of object candidate area, at first, smoothing processing of U map information is conducted (step S21). In the smoothing processing, portions between discrete pixels, having a given frequency or more and existing within a given range (e.g., given pixel numbers), on the U map are filled to connect discrete pixels.

Figure 13:
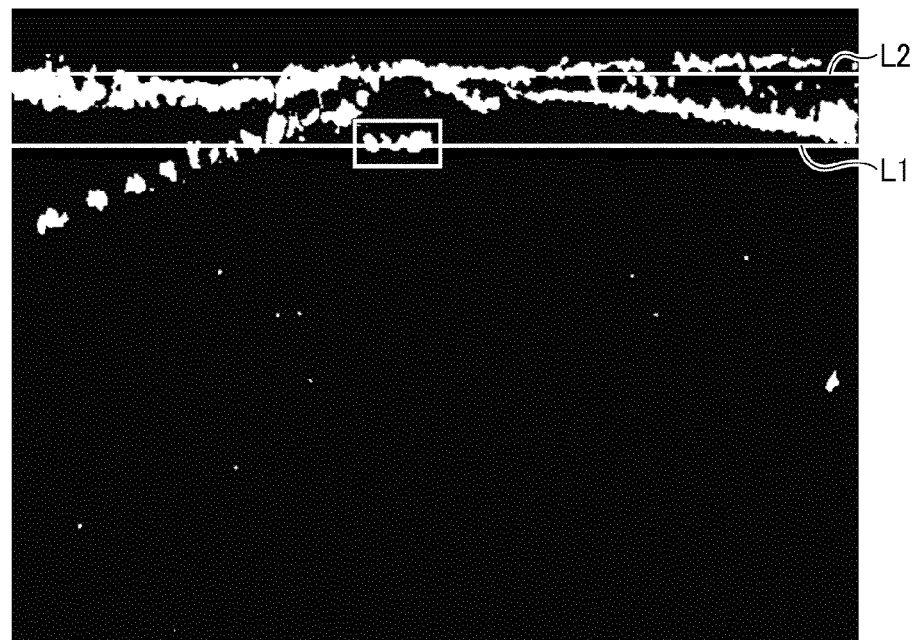
FIG. 13 is an example image of U map after conducting smoothing processing and threshold processing to the U map image of FIG. 10.

Then, threshold processing such as binarization processing is conducted to the smoothed U map information (step S22). Specifically, a pixel value having a value of a given threshold or less (frequency f) is set to zero (0), and a pixel value having a value exceeding the given threshold (frequency f) is set to one (1) on the U map. The threshold for binarization processing is preferably set by experiments in advance or can be set based on estimation from an image. For example, an average value h of pixel values (frequency f) on the U map is computed, and the average value h is multiplied with a given coefficient K to obtain a value of "K×h" used as a threshold. The given coefficient K is preferably set by experiments in advance. FIG. 13 is an example image of U map after the threshold processing.

Then, Hough conversion is conducted to the U map information having received the threshold processing to extract a horizontal line extending in the horizontal axis direction of the U map (step S23). FIG. 13 shows two horizontal lines L1 and L2 extracted by the Hough conversion. Then, an isolated area indicating a feature of the above described horizontal line pattern is searched along the extracted horizontal lines L1 and L2 to extract the isolated area (step S24).

For example, the extraction of the isolated area is conducted by searching pixels having a value not zero along the extracted horizontal lines L1 and L2. If other pixels having a value not zero exist within a given range (i.e., within given pixel numbers "n") from one certain target pixel, the certain target pixel and the other pixels are grouped as the same group. This searching is continued until pixels having a value not zero but not yet grouped to the group and existing within the given range (i.e., within given pixel numbers "n") is exhausted by the searching.

Such searching is conducted from one end to other end of the image left-to-right direction on the horizontal lines L1 and L2. Then, the number of pixels of the obtained each group is counted. If the pixel numbers is the threshold M or more set in advance, the group is detected as one isolated area. For example, a given pixel number n=8, and the threshold M=20 can be set. With this processing, the isolated area (e.g., an area encircled by a white line frame in FIG. 13) is detected along the horizontal line L1, and the isolated area includes a pixel group having a feature of horizontal line pattern.

When the isolated area is detected (step S25: YES), an image width $\Delta x$ of the isolated area indicated by an image left-to-right direction length on the U map, and a parallax range $\Delta d$ of the isolated area indicated by an image upper-to-lower direction length on the U map are computed (step S26). When the isolated area is not detected (step S25: NO), a result indicating that the isolated area does not exist is output to the target recognition unit 206 (step S27).

Figure 14:
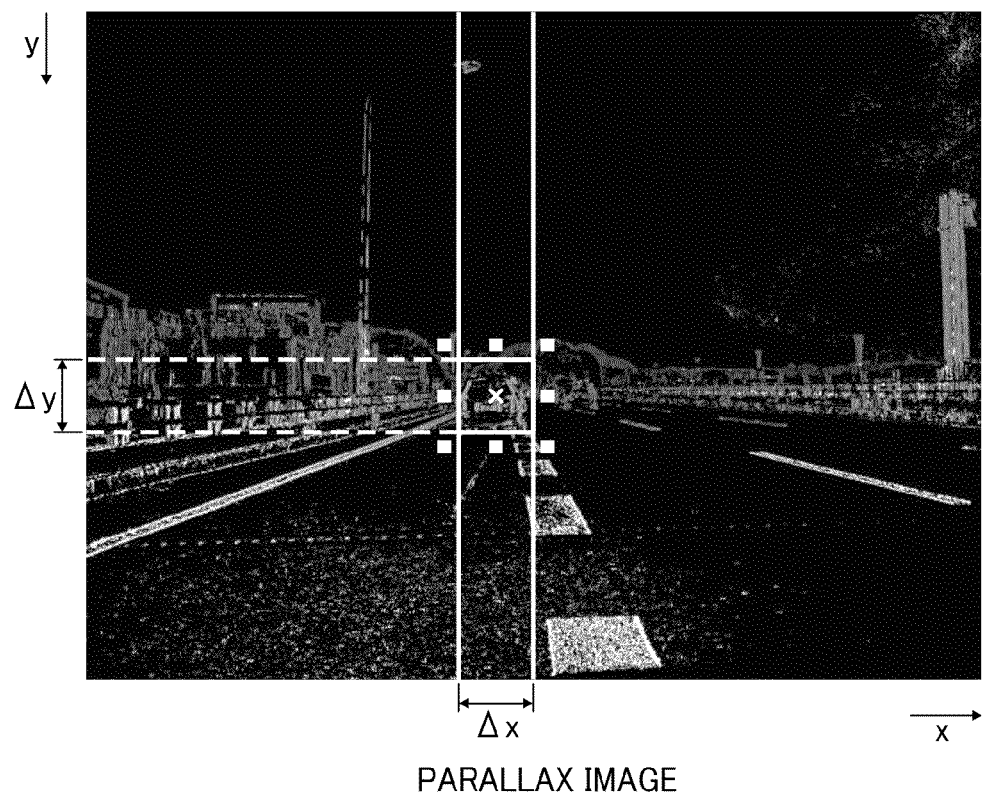
FIG. 14 shows an object candidate area on parallax image.

When the image width $\Delta x$ and the parallax range $\Delta d$ of the isolated area are computed, as shown in FIG. 14, an object candidate area on the parallax image can be extracted as an area encircled by a white line frame based on the image width $\Delta x$ and the parallax range $\Delta d$. Specifically, at first, pixels having parallax values within the parallax range $\Delta d$ and existing in the area of the image width $\Delta x$ on the parallax image are extracted from parallax image data (step S28). Then, based on the extracted pixels, for example, the above described group processing is conducted to extract a group of pixels adjacent with each other (step S29). Then, an outline of the extracted pixel group is extracted (step S30). An area encircled by the extracted outline is output as an object candidate area (step S31).

Figure 15:
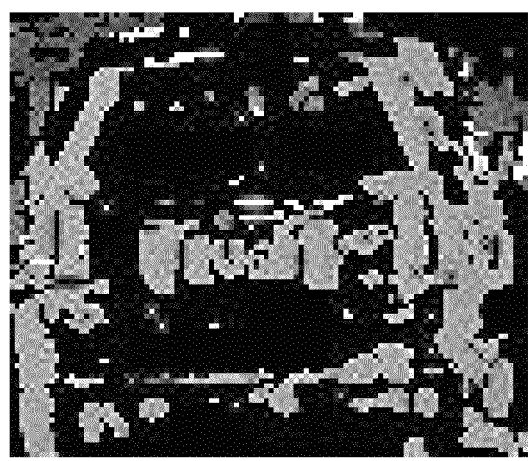
FIG. 15 is an example of an expanded image of object candidate area encircled by a white line frame of FIG. 14.

In this example case, a rectangular shape circumscribing the extracted pixel group is extracted as the outline of extracted pixel group. The object candidate area obtained by this process becomes the area encircled by a white line frame of FIG. 14. FIG. 15 is an example of an expanded image of object candidate area encircled by the white line frame of FIG. 14.

Upon detecting the object candidate area by the object candidate area detection unit 205, then, as shown in FIG. 7, an average value of pixel values on the parallax image (average parallax value) in the detected object candidate area is computed (step S5). The average parallax value can be computed by totaling parallax values corresponding to pixels existing in the object candidate area and dividing the totaled parallax values by the number of pixels existing in the concerned object candidate area. Instead of the average parallax value, for example, a median of parallax values corresponding to pixels existing in the object candidate area obtained using a known filter can be used. Further, for example, among parallax values corresponding to pixels existing in the object candidate area, a parallax value having the greatest frequency can be used instead of the average parallax value.

Then, a width (horizontal size) and a height (vertical size) of an object displayed in the object candidate area are computed (step S6). In this processing, at first, based on the average parallax value of the object candidate area, a distance between the vehicle 100 and the object displayed in the concerned object candidate area is computed. Then, by using the computed distance, the image left-to-right direction length Δx of the object in the object candidate area is converted to the horizontal size, and the image upper-to-lower direction length Δy of the object in the object candidate area is converted to the vertical size.

Figure 4:
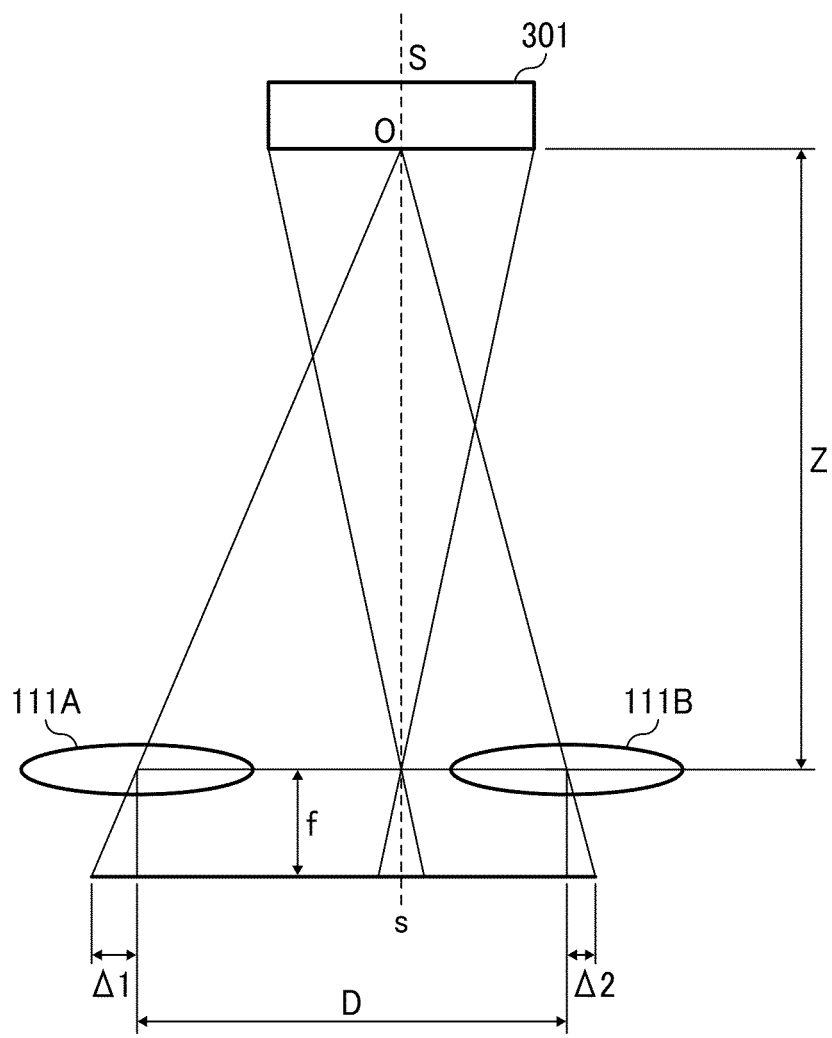
FIG. 4 is a schematic view of parallax when an image is captured by left and right cameras.

This computation can be described with reference to FIG. 4. When the average parallax value of the object candidate area is defined as "$d_{ave}$," a relationship of a distance Z from the object 301 to the stereo camera and the average parallax value $d_{ave}$ can be expressed by the following equation (1), in which a focal distance of the stereo camera is defined as F, and a distance between the left and right camera lenses is defined as D. Further, based on the following equation (1), the distance Z can be expressed by the following equation (2). Based on the equation (2), the distance Z to the object displayed in the object candidate area can be computed.

$$d_{ave}:F=D:Z \tag{1}$$

$$Z=D\times F/d_{ave} \tag{2}$$

A relationship of size "S1" in the object candidate area and an actual size "S2" of the corresponding object can be expressed by the following equation (3). Based on the equation (3), the actual size "S2" can be expressed by the following equation (4). Based on the equation (4), the actual size S2 of the object can be computed.

$$S2:Z=S1:F \tag{3}$$

$$S2=S1\times Z/F \tag{4}$$

If any one of the above computed width (horizontal size) and height (vertical size) of the object is not within a threshold range such as Wmin, Wmax, Hmin, Hmax (W: width, H: height) corresponding to the actual size S2 of the target object (step S7: NO), it is determined that an error recognition occurs, and the concerned object candidate area is deleted (step S8). For example, if both of the width (horizontal size) and height (vertical size) of the object are not within the threshold ranges such as Wmin, Wmax, Hmin, Hmax of the target object, it can be determined that an error recognition occurs. This determination can be preferably conducted by setting conditions having enhanced recognition precision based on experiments or the like. Further, the threshold range Wmin, Wmax, Hmin, Hmax of target objects can be preferably set based on experimental data actually sampled from each of target objects.

Figures 16, 17:
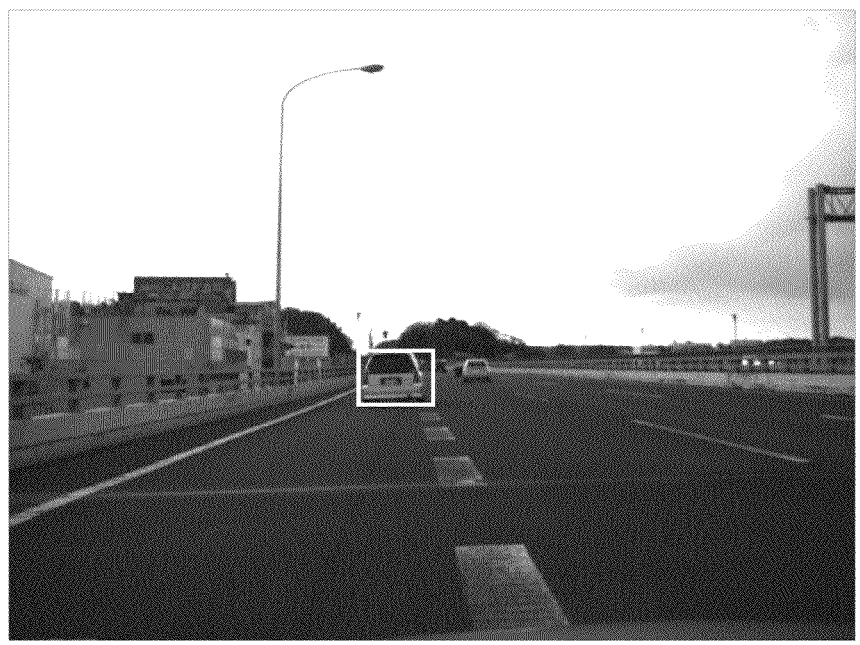
FIG. 16 is an example table of each of thresholds of actual size range of target objects.
FIG. 17 shows an object candidate area indicated in the luminance image of FIG. 8.

FIG. 16 is an example of a table having each of thresholds such as Wmin, Wmax, Hmin, and Hmax for an actual size range of target objects obtainable by in-advance learning, in which Wmin is a minimum value of the horizontal size, and Wmax is a maximum value of the horizontal size, Hmin is a minimum value of the vertical size, and Hmax is a maximum value of the vertical size. Such table data can be stored in a memory in advance. Based on the width (horizontal size) and height (vertical size) of the object displayed in the object candidate area and by referring the table data, the target recognition unit 206 classifies that a concerned object corresponds to which one of the target objects (step S9). Then, the target recognition unit 206 uses other recognition process result such as luminance information, as required, to recognize which one of the target objects corresponds to the concerned object (step S10), and outputs a recognition result (step S11). Based on this output recognition result, an object candidate area is displayed on the luminance image as shown in FIG. 17.

The target recognition unit 206 can conduct a recognition processing using the actual size S2 of the target object, and further the target recognition unit 206 can conduct a recognition processing using luminance image data. In this recognition processing, a recognition-use dictionary is prepared by a machine learning method using image sample learning data sampled by recognizing objects in advance, in which different recognition-use dictionaries are prepared for different target objects. In this example case, the target object is classified as vehicles such as automobiles, and a recognition processing of target object is conducted by using a recognition-use dictionary used for recognizing automobiles prepared by the in-advance learning and a recognition program for recognizing automobiles. A description is given of recognition processing using luminance image data.

Figure 18:
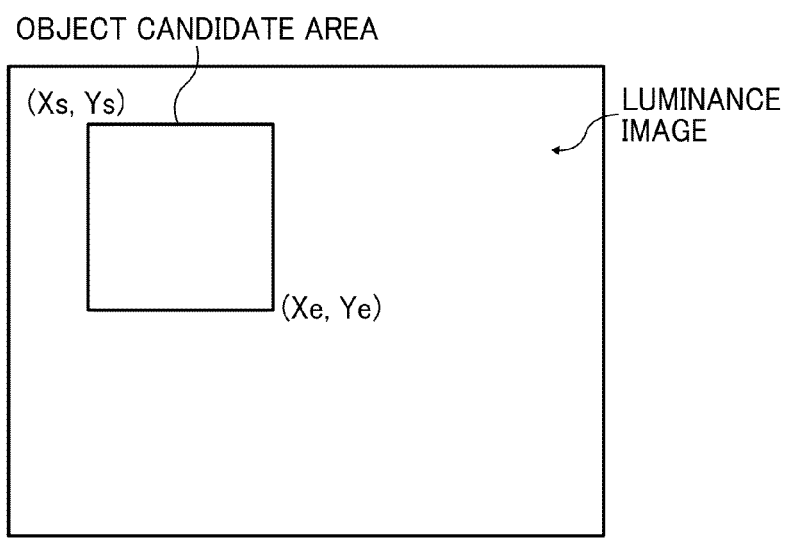
FIG. 18 is a schematic view of an object candidate area set on luminance image.
Figure 19A:
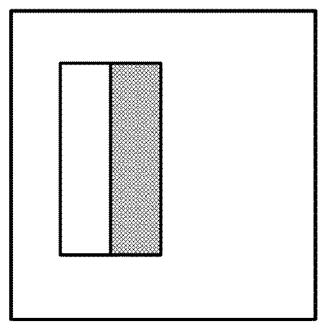
FIGS. 19A, 19B, 19C and 19D show four types of feature pattern.
Figure 19B:
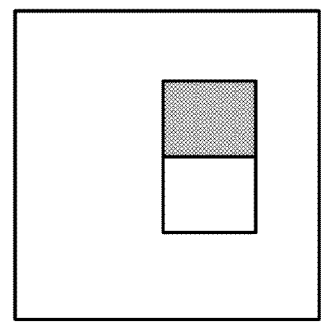
Figure 19C:
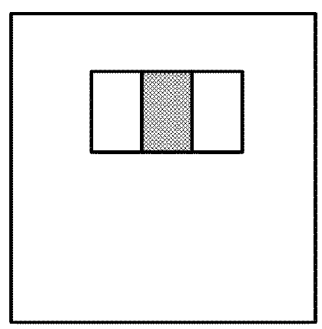
Figure 19D:
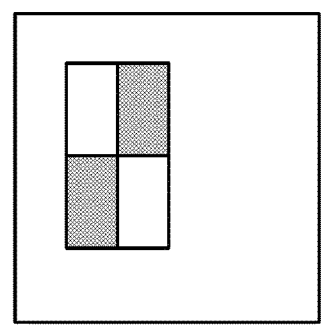

Based on luminance image (reference image) input from the luminance image input unit 202, as shown in FIG. 18, the target recognition unit 206 sets the object candidate area on the luminance image corresponding to a detection result of the object candidate area. The position and size of the concerned object candidate area on the luminance image can be determined based on a top-left coordinate (Xs, Ys) and a bottom-right coordinate (Xe, Ye) of the object candidate area.

Then, the target recognition unit 206 computes a feature value for the object candidate area set on the luminance image. For example, the target recognition unit 206 computes a feature value of a white area and a feature value of a black area for four types of white/black blocks shown in FIG. 19. Specifically, as to each of white/black blocks A to D shown in FIG. 19, a total pixel value corresponding to the white area in the object candidate area, and a total pixel value corresponding to the black area in the object candidate area are computed. Then, the total pixel value for the black area is subtracted from the total pixel value for the white area to obtain a value used as a feature value h(x) for each type of white/black blocks in the concerned object candidate area.

Based on the above computed feature value h(x), an evaluation value f(x) is computed using the following evaluation function (below equation (5)). The evaluation value f(x) can be computed as follows. For each type of the white/black blocks (t=1 to T) (e.g., T=4 when four types white/black blocks are used as shown in FIG. 19), the feature value $h_t(x)$ for each type of the white/black blocks is computed. The computed feature value $h_t(x)$ is multiplied by a weight coefficient $\alpha_t$ set for each type of white/black blocks to obtain a weighted feature value $\alpha_t \times h_t(x)$ for each of the white/black blocks. The weighted feature value $\alpha_t \times h_t(x)$ obtained for each of the white/black blocks are added together to compute the evaluation value f(x). The feature value $h_t(x)$ and the weight coefficient $\alpha_t$ can be obtained by collecting learning data for the luminance image of the target objects, and by conducting learning process using the learning data.

$$f(x)=\sum_{t=1}^{T}\alpha_t h_t(x) \tag{5}$$

Figure 20:
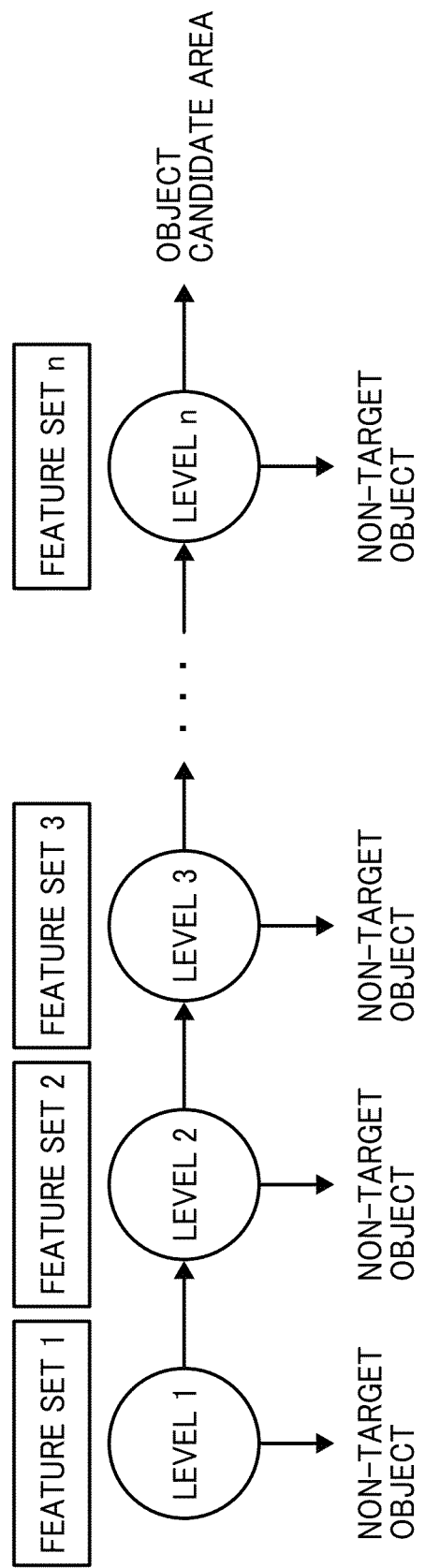
FIG. 20 is a schematic configuration of a recognition unit used for a recognition processing of a target object.

A recognition unit used for the recognition processing of the target object includes a plurality of levels 1 to n (n is a positive integer) as shown in FIG. 20. Each of the levels 1 to n has a specific evaluation function using a set of features (feature value $h_r(x)$ and weight coefficient $\alpha_r$) which are different with each other, wherein the feature value $h_r(x)$ and weight coefficient $\alpha_r$ indicate a specific target object.

Then, the evaluation value f(x) is computed using an evaluation function of level 1 (recognition unit) for above described the object candidate area. If the computed evaluation value is smaller than a threshold set for the level 1 in advance, it is determined that the target object is not displayed in the concerned object candidate area. Then, this determination is conducted for each of the levels 2 to n sequentially. If it is determined that the evaluation value f(x) is the threshold or more for the entire levels such as for the first level to the last level "n," it is determined that the target object is displayed in the concerned object candidate area.

For example, to roughly determine whether a feature indicating an automobile exists at the level 1, an evaluation value $f_1(x)$ is computed using four types of white/black blocks shown in FIG. 19, and the evaluation value $f_1(x)$ is compared with the corresponding threshold.

In the object candidate area shown as an example image in FIG. 17, when an evaluation using the white/black block A shown in FIG. 19 is conducted at the level 1, a feature value $H_1(x)$ for the concerned object candidate area becomes substantially zero. However, when an evaluation using the white/black block B shown in FIG. 19 is conducted, a feature value $H_2(x)$ for the concerned object candidate area becomes effectively great. Therefore, the evaluation value $f_1(x)(=H_1(x)+H_2(x)+H_3(x)+H_4(x))$ at the level 1 computed from theses feature values becomes the threshold value or more of the level 1, and then the evaluation is shifted to an evaluation at a next level (level 2).

At the level 2, blocks having white/black pattern finer than the four types of white/black blocks of FIG. 19 are prepared, and the number of types of blocks is typically set greater than four types prepared for the level 1. Then, at the level 2, a feature value $H_r(x)$ for each of white/black blocks of the level 2 are obtained to compute an evaluation value $f_2(x)$. If the evaluation value $f_2(x)$ is a threshold or more of the level 2, the evaluation is shifted to an evaluation at a next level (level 3). This processing is repeatedly conducted for the subsequent levels. If an evaluation value $f_n(x)$ of the last level "n" is a threshold or more, it is determined that the concerned object candidate area is a candidate area of the vehicle displayed in the image.

Further, feature value $h_r(x)$, weight coefficient $\alpha_r$, coordinates of a upper-left corner point among four corner points where two sides of each of the four types of white/black blocks (shown in FIG. 19) intersect, a block size of white/black block such as horizontal width and vertical width, coordinates of upper-left corner point among four corner points where two sides of the white area (or black area) intersect, size of the white area and the black area, and thresholds for evaluation at each of the levels "1 to n" can be stored as data of recognition-use dictionary.

In the example embodiment, the above described recognition unit can be used for the luminance image to determine whether a target object is displayed on the object candidate area. If it is determined that the target object is displayed, a recognition result that the target object (e.g., automobile) is displayed on the object candidate area is output (step S11).

The above described example embodiment may have following configurations.

Embodiment A

The above described object detection apparatus 200 can detect an object such as other vehicles in an image capturing area based on parallax information generated using a plurality of captured images (reference image and comparison image) captured by a plurality of image capturing units such as two image capturing units 110A and 110B.

The object detection apparatus 200 includes a parallax histogram information generator such as the U map generator 204 to generate vertical-direction parallax histogram information such as U map information indicating a frequency profile of parallax values in each of vertical row areas that is prepared by dividing the captured images in a plurality of areas in a left-right direction based on the parallax information; and an object image area extraction unit such as the object candidate area detection unit 205 to extract, among parallax values d having frequency f exceeding a given frequency threshold, a group of pixels having parallax values existing within proximity of a given parallax value and having an interval $\Delta l$ (el) in an image left-to-right direction within a given range, as an object image area displaying an object based on the vertical-direction parallax histogram information. With this configuration, the object detection processing can be conducted by detecting each object with high precision selectively with a shorter processing time.

Embodiment B

In the above Embodiment A, the object image area extraction unit conducts Hough conversion to pixels having parallax values d having frequency f exceeding the given frequency threshold on a two dimensional coordinate system, defined by parallax values d prepared from the vertical-direction parallax histogram information and image left-to-right direction positions x, to extract a straight line such as the horizontal line (horizontal straight line) L1 extending in the image left-to-right direction. The object image area extraction unit extracts the group of pixels having parallax values d existing within proximity of a given parallax value and having an interval $\Delta l$ (el) in an image left-to-right direction within a given range using the extracted straight line as a reference. With this configuration, the object detection processing can be conducted by detecting each one of objects selectively with a shorter processing time and with high precision.

Embodiment C

In the above Embodiments A or B, the object detection apparatus further includes an object image area extraction unit to extract a group of pixels on a parallax image, prepared based on the parallax information, as an object image area displaying an object. With this configuration, the height of object displayed in the object image area can be determined easily.

Embodiment D

In any one of the Embodiments A to C, the object detection apparatus further includes a target object determination unit such as the target recognition unit 206 to determine whether an object corresponding an object image area extracted by the object image area extraction unit is a target object. With this configuration, it can determine whether an object displayed in the object image area is a target object.

Embodiment E

In the above Embodiment D, the object detection apparatus further includes an object width identifying unit such as the target recognition unit 206 to identify a width (horizontal size) of an object corresponding to the concerned object image area based on an image left-to-right direction length such as the image width Δx and parallax values such as the average parallax value $d_{ave}$ of the concerned object image area extracted by the object image area extraction unit. The target object determination unit determines whether an object corresponding to the object image area extracted by the object image area extraction unit is a target object based on a width of the concerned object identified by the object width identifying unit. With this configuration, the object recognition can be conducted with enhanced precision.

Embodiment F

In the above Embodiments D or E, the target object determination unit determines whether an object corresponding to an object image area extracted by the object image area extraction unit is a target object based on luminance information of the object image area. With this configuration, the object recognition can be conducted with enhanced precision.

Embodiment G

As above described, a vehicle-device control system can include a plurality of image capturing units such as two image capturing units 110A and 110B to capture an area around a moveable unit such as the vehicle 100 as an image capturing area; the object detection apparatus of any one of above embodiment A to F to detect an object in the image capturing area based on a plurality of captured images captured by the plurality of image capturing units; and a vehicle-device control unit such as the headlight control unit 103 and/or the vehicle drive control unit 106 to control one or more devices equipped to the vehicle based on a detection result of the object detection apparatus. With this configuration, the object detection processing can be conducted by detecting each object with high precision selectively with a shorter processing time, and one or more devices equipped to the vehicle can be controlled effectively with a shorter time.

Embodiment H

As above described, a computer-readable carrier medium or non-transitory computer-readable storage medium stores an object detection program that, when executed by a computer having a processing circuit, causes the computer to execute a method of detecting an object in an image capturing area based on parallax information, the method comprising the steps of generating parallax information based on the plurality of captured images based on a plurality of captured images captured by a plurality of image capturing units (generating step of parallax information); 1) generating parallax information based on the plurality of captured images captured by a plurality of image capturing units (generating step of parallax information); 2) generating vertical-direction parallax histogram information indicating a frequency profile of parallax values in each of vertical row areas in a captured image based on the parallax information, the vertical row area preparable by dividing the captured image in a plurality of areas in a left-right direction (generating step of vertical-direction parallax histogram information); and 3) extracting, among parallax values having frequency exceeding a given frequency threshold, a group of pixels having parallax values existing within proximity of a given parallax value and having a pixel-to-pixel interval in the image left-to-right direction within a given range as an object image area displaying an object based on the vertical-direction parallax histogram information (extracting step of object image area). With this configuration, the object detection processing can be conducted by detecting each object with high precision selectively with a shorter processing time.

The above described object detection processing that can selectively detect each object with high precision with a shorter processing time can be applied to an object detection apparatus, a vehicle-device control system and an object detection program.

In the above described example embodiment, a captured image is divided in a plurality of areas in the left-right direction to prepare vertical row areas in the captured image. Among parallax values having frequency exceeding a given frequency threshold, a group of pixels having parallax values existing within proximity of a given parallax value and having a pixel-to-pixel interval in the image left-to-right direction within a given range are extracted. Pixels corresponding to parallax values having frequency exceeding the given frequency threshold means pixels having relatively greater pixel numbers corresponding to the same parallax value in one vertical row area. Further, the group of pixels corresponding to parallax values existing within proximity of a given parallax value means that each of portions displayed by these pixels are gathering of pixels proximal with each other within a distance corresponding to the proximity of a given parallax value (distance from the image capturing unit). In other words, the group of pixels display the portions having the same or similar distance from the image capturing unit. Therefore, the group of pixels corresponding to the proximity of a given parallax value, among parallax values having frequency exceeding a given frequency threshold, can be a group of pixels displaying a portion having the same or similar distance from the image capturing unit and a constant height. Further, when a condition that the pixel-to-pixel interval in the image left-to-right direction is within a given range is further added, the group of pixels having such condition can be a group of pixels of a face displaying a portion having the same or similar distance from the image capturing unit and a constant height and a constant width. This face can be as one face on an object. Therefore, by extracting the above described pixel group, each object in the image capturing area can be selectively detected with high precision.

In the above described example embodiment, the pixel group is extracted based on the vertical-direction parallax histogram information. The vertical-direction parallax histogram information indicates a frequency profile of parallax values in each vertical row area, prepared by dividing the captured image in a plurality of areas in an image left-to-right direction. Therefore, the vertical-direction parallax histogram information includes at least three types of information for each pixel on captured images such as the image left-to-right direction position, the parallax value, and the frequency of the concerned parallax value in each vertical row area corresponding to the image left-to-right direction position. For example, marks (indicators) corresponding to parallax values having frequency exceeding a given frequency threshold can be plotted on a two-dimensional coordinates system setting parallax values at the vertical axis and setting image left-to-right direction positions at the horizontal axis. The above described pixel group may have a feature that the pixel group becomes a horizontal line pattern on the two-dimensional coordinate system. The above pixel group can be extracted from the vertical-direction parallax histogram information using this feature. Further, the vertical-direction parallax histogram information can be generated from parallax information with high speed processing. Therefore, based on the vertical-direction parallax histogram information, the above described pixel group, which means the pixel group displaying a face having the same or similar distance from the image capturing unit and a constant height and a constant width (e.g., pixel group displaying an object) can be extracted with a shorter processing time.

With the above described configuration, the above described object detection processing that can selectively detect each object with high precision can be conducted with a shorter processing time.

The program can be distributed by storing the program in a storage medium or carrier medium such as CD-ROM. Further, the program can be distributed by transmitting signals from a given transmission device via a transmission medium such as communication line or network (e.g., public phone line, specific line) and receiving the signals. When transmitting signals, a part of data of the program is transmitted in the transmission medium, which means, entire data of the program is not required to be on in the transmission medium. The signal for transmitting the program is a given carrier wave of data signal including the program. Further, the program can be distributed from a given transmission device by transmitting data of program continually or intermittently.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a Wireless Application Protocol (WAP) or 3G-compliant phone) and so on. Since the present invention can be implemented as software, each and every aspect of the present invention thus encompasses computer software implementable on a programmable device.

The computer software can be provided to the programmable device using any storage medium, carrier medium, carrier means, or digital data carrier for storing processor readable code such as a flexible disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic Tape, a hard disk in a server, a solid state memory device or the like, but not limited these.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, work station) may control an information processing apparatus or an image processing apparatus such as image forming apparatus using a computer-readable program, which can execute the above-described processes or steps. In the above described embodiments, at least one or more of the units of apparatus can be implemented in hardware or as a combination of hardware/software combination. In example embodiment, processing units, computing units, or controllers can be configured with using various types of processors, circuits, or the like such as a programmed processor, a circuit, an application specific integrated circuit (ASIC), used singly or in combination.

Numerous additional modifications and variations are possible in light of the above teachings. It is therefore to be understood that, within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An object detection apparatus, using at least one processing circuit, for detecting an object in an image capturing area based on parallax information generated from a plurality of images captured by a plurality of cameras, the object detection apparatus comprising:

a processor configured to, generate vertical-direction parallax histogram information based on the parallax information, the vertical-direction parallax histogram information indicating a frequency profile of parallax values in each of vertical row areas in a captured image, the vertical row area preparable by dividing the captured image in a plurality of areas in a left-right direction, extract, among parallax values having frequency exceeding a given frequency threshold, a group of pixels having parallax values existing within proximity of a given parallax value and having a pixel-to-pixel interval in an image left-to-right direction within a given range, as an object image area that includes an object for display, based on the vertical-direction parallax histogram information, calculate a width and a height of the object based on the extracted object image area, compute data corresponding to an actual horizontal size and vertical size of the object based on the parallax information at the object image area and the calculated width and height of the object, and determine a type of the object based on the computed data by, determining whether the actual horizontal size and vertical size are within a threshold width and a threshold height for one of a plurality of types of objects, computing, for each of a plurality of blocks, a weighted feature value between the object image area of a respective one of the plurality of blocks and a luminance image, and computing an evaluation value based on the weighted feature values for each of the plurality of blocks.

2. The object detection apparatus of claim 1, wherein the processor,
- conducts Hough conversion to pixels having parallax values having frequency exceeding the given frequency threshold on a two dimensional coordinate system, defined by parallax values prepared from the vertical-direction parallax histogram information and image left-to-right direction positions, to extract a straight line extending in the image left-to-right direction, and
- extracts the group of pixels having parallax values existing within proximity of a given parallax value and having a pixel-to-pixel interval in the image left-to-right direction within a given range using the extracted straight line as a reference.

3. The object detection apparatus of claim 1, wherein the processor extracts the group of pixels as an object image area displaying an object on a parallax image prepared based on the parallax information.

4. A vehicle-device control system comprising:
- a plurality of cameras to capture an area outside a vehicle as an image capturing area;
- the processor of claim 1 to detect an object in the image capturing area based on a plurality of captured images; and
- a controller to control one or more devices equipped to the vehicle based on a detection result of the object detection apparatus.

5. A method of detecting an object in an image capturing area based on parallax information, the method comprising the steps of:
- generating parallax information based on a plurality of captured images captured by a plurality of cameras;
- generating vertical-direction parallax histogram information indicating a frequency profile of parallax values in each of vertical row areas in a captured image based on the parallax information, the vertical row area preparable by dividing the captured image in a plurality of areas in a left-right direction;
- extracting, among parallax values having frequency exceeding a given frequency threshold, a group of pixels having parallax values existing within proximity of a given parallax value and having a pixel-to-pixel interval in an image left-to-right direction within a given range as an object image area displaying an object, based on the vertical-direction parallax histogram information calculating a width and a height of the object based on the extracted object image area;
- computing data corresponding to an actual horizontal size and vertical size of the object based on the parallax information at the object image area and the calculated width and height of the object; and
- determining a type of the object based on the computed data by,
    - determining whether the actual horizontal size and vertical size are within a threshold width and a threshold height for one of a plurality of types of objects,
    - computing, for each of a plurality of blocks, a weighted feature value between the object image area of a respective one of the plurality of blocks and a luminance image, and
    - computing an evaluation value based on the weighted feature values for each of the plurality of blocks.

6. A non-transitory computer-readable storage medium storing an object detection program that, when executed by a computer having a processing circuit, causes the computer to execute a method of detecting an object in an image capturing area based on parallax information, the method comprising the steps of:
- generating parallax information based on a plurality of captured images captured by a plurality of cameras;
- generating vertical-direction parallax histogram information indicating a frequency profile of parallax values in each of vertical row areas in a captured image based on the parallax information, the vertical row area preparable by dividing the captured image in a plurality of areas in a left-right direction;
- extracting, among parallax values having frequency exceeding a given frequency threshold, a group of pixels having parallax values existing within proximity of a given parallax value and having a pixel-to-pixel interval in an image left-to-right direction within a given range as an object image area displaying an object, based on the vertical-direction parallax histogram information
- calculating a width and a height of the object based on the extracted object image area;
- computing data corresponding to an actual horizontal size and vertical size of the object based on the parallax information at the object image area and the calculated width and height of the object; and
- determining a type of the object based on the computed data by,
    - determining whether the actual horizontal size and vertical size are within a threshold width and a threshold height for one of a plurality of types of objects,
    - computing, for each of a plurality of blocks, a weighted feature value between the object image area of a respective one of the plurality of blocks and a luminance image, and
    - computing an evaluation value based on the weighted feature values for each of the plurality of blocks.

* * * * *